United States Patent
Lienhart et al.

(10) Patent No.: US 7,146,050 B2
(45) Date of Patent: Dec. 5, 2006

(54) FACIAL CLASSIFICATION OF STATIC IMAGES USING SUPPORT VECTOR MACHINES

(75) Inventors: Rainer W. Lienhart, Santa Clara, CA (US); Jochen Maydt, Weinheim (DE)

(73) Assignee: Intel Corporation, Santa Clara, CA (US)

( * ) Notice: Subject to any disclaimer, the term of this patent is extended or adjusted under 35 U.S.C. 154(b) by 727 days.

(21) Appl. No.: 10/199,581

(22) Filed: Jul. 19, 2002

(65) Prior Publication Data
US 2004/0013303 A1 Jan. 22, 2004

(51) Int. Cl.
*G06K 9/62* (2006.01)

(52) U.S. Cl. .............. 382/224; 382/159; 382/253; 382/276; 706/20

(58) Field of Classification Search .............. 382/224, 382/103, 159, 253, 276; 706/12, 14, 15, 706/16, 19, 20, 21, 31, 41, 25, 45; 707/5; 708/323; 704/9
See application file for complete search history.

(56) References Cited

U.S. PATENT DOCUMENTS

| | | | | |
|---|---|---|---|---|
| 5,950,146 A | * | 9/1999 | Vapnik | 702/153 |
| 6,112,195 A | * | 8/2000 | Burges | 706/20 |
| 6,134,344 A | * | 10/2000 | Burges | 382/155 |
| 6,327,581 B1 | * | 12/2001 | Platt | 706/12 |
| 6,658,395 B1 | * | 12/2003 | Barnhill | 706/16 |
| 6,671,391 B1 | * | 12/2003 | Zhang et al. | 382/118 |
| 6,803,933 B1 | * | 10/2004 | Staelin et al. | 347/131 |
| 6,882,990 B1 | * | 4/2005 | Barnhill et al. | 706/16 |

* cited by examiner

*Primary Examiner*—Sheela Chawan
(74) *Attorney, Agent, or Firm*—Sanjay S. Gadkari (57) ABSTRACT

A procedure for fast training and evaluation image classification systems using support vector machines (SVMs) with linear input features of high dimensionality is presented. The linear input features are derived from raw image data by means of a set of m linear functions defined on the k-dimensional raw input data, and are used for image classification, including facial recognition tasks.

39 Claims, 5 Drawing Sheets

FACIAL CLASSIFICATION OF STATIC IMAGES USING SUPPORT VECTOR MACHINES

RELATED APPLICATIONS

The present application is related to pending U.S. patent application Ser. No. 10/199,744 entitled "For: A FAST METHOD FOR TRAINING AND EVALUATING SUPPORT VECTOR MACHINES WITH A LARGE SET OF LINEAR FEATURES," and assigned to the assignee of the present invention.

FIELD OF THE INVENTION

The present invention relates to computer mediated object detection. More particularly, the present invention relates to improved support vector machines for classifying digital image data, including facial features.

BACKGROUND

Machine identification or classification of imaged body features is difficult with currently available techniques. Security applications and advanced computer user interface systems supporting even rudimentary imaging capability can be augmented if the system is capable of determining presence (and number) of bodies, or allows for accurate identification of particular areas of the body (including face or palm recognition). To be generally useful, such systems should be able to robustly identify target classes in the presence of other objects, under conditions of varying illumination, when subjected to various rotations, when partially occluded, or when altered by color changes.

Identifying and classifying faces in two dimensional images is particularly useful for low impact security applications. Three approaches have been widely used to identify variable form objects such as faces. The first approach uses a predefined model, and the machine system attempts to find a match using various geometric criteria. Unfortunately, such systems require substantial effort to build models, and are prone to errors in uncontrolled situations that permit rotation or occlusion of the target object. Another approach uses brightness or color level matching to identify an object. While not as susceptible to rotation or occlusion errors, a searchable model must still be constructed, and illumination errors (eg. failure under conditions of changing illumination, when backlit, etc.) can occur.

Because of such problems with model based systems, development of example based machine vision systems is an active research area. An example based system automatically finds useful identification features of a class as a result of training on a class of positive and negative labelled examples. The feature set of labelled examples can vary in size, quality of images, and types of images, and does not require potentially biased human modelling that can result in inefficient or redundant classification criteria.

Any machine learning algorithm for classification/regression highly depends on the type and quality of the feature set. A feature set should ideally reduce intra-class variance and still be highly discriminative. Generally, it is desirable to use a rather small set of features to avoid dimensionality related problems and to speed up training and classification. Due to their simplicity, it is quite common to use linear features as the input to a classifier. There is a variety of powerful analysis methods, which derive linear features from raw input data including principal component analysis, Fisher discriminant analysis, Fourier transforms, Sobel-gradients, wavelets, and haar-likes.

Support vector machines (SVMs) are a class of learning algorithms for classification/regression that are particularly useful for high dimensional input data with either large or small training sets. Support vector machines suitable for class identification problems work by mapping the input features to the SVM into a high-dimensional feature space and computing linear functions on those mapped features in the high-dimensional feature space. The optimization problem that must be solved during training of a support vector machine has a global minimum and can generally be solved with standard quadratic programming tools. In operation, a support vector machine creates a function from a set of labeled training data. The function can either be a classification function where the output is a binary decision (the input being a category) or the function can be a general regression function. For classification, support vector machines operate by finding a hypersurface in the feature space (of the SVM). This hypersurface will attempt to split the positive examples from the negative examples. The split will be chosen to have the largest distance from the hypersurface to the nearest of the positive and negative examples, generally making the classification correct for testing data that is near, but not identical to the training data.

There are two simple conventional methods to train and evaluate a support vector machine using linear input features. The first method caches all linear feature vectors $z_i = Ax_i$, (i.e., it pre-computes the linear features $z_i$; $x_i$ denotes the raw input data of training sample i, and A is a matrix specifying all the linear features that are to be derived from the input data $x_i$) and then uses these vectors to calculate kernel elements $K(z_i, z_j)$. Evaluation of a classifier then simply transforms an input pattern x to $z = Ax$ and uses $K(z, z_i)$ in $$\text{class}(x) = \text{sign}\left[\left(\sum_{i=1}^{n} y_i \alpha_i K(z, z_i)\right) + b\right] = \text{sign}\left[\left(\sum_{i=1}^{n} y_i \alpha_i K(Ax, z_i)\right) + b\right]$$

where $\alpha_i$ is the optimal solution of the maximization problem, b the associated threshold, $y_{i \in \{-1,+1\}}$ the pattern label of support vector i, and n the size of the support vector set ($i \in \{1, 2, \ldots, n\}$).

For a large number of linear features (e.g., larger than a few thousand) it is usually not possible to store all vectors $z_i$ in memory, either for training or for evaluation. For instance, assuming a derivation of 250,000 linear features from each input data of dimension k<<250,000, a single feature vector may require more than one megabyte of memory storage making training sets with n>1,000 prohibitively expensive with present day computational resources.

Alternatively, to conserve memory, the function $z_i = Ax_i$ can be computed each time a kernel element $K(z_i, z_j)$ is accessed. This requires only storage of the original training examples $x_i$. Evaluating a classifier then computes $z = Ax$ and $z_i = Ax_i$ for each support vector i. However, this method is computationally very expensive because training a support vector machine needs many evaluations of the kernel function. Even with a kernel cache, far more than $10^6$ kernel evaluations to train a classifier on a training set may be required.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
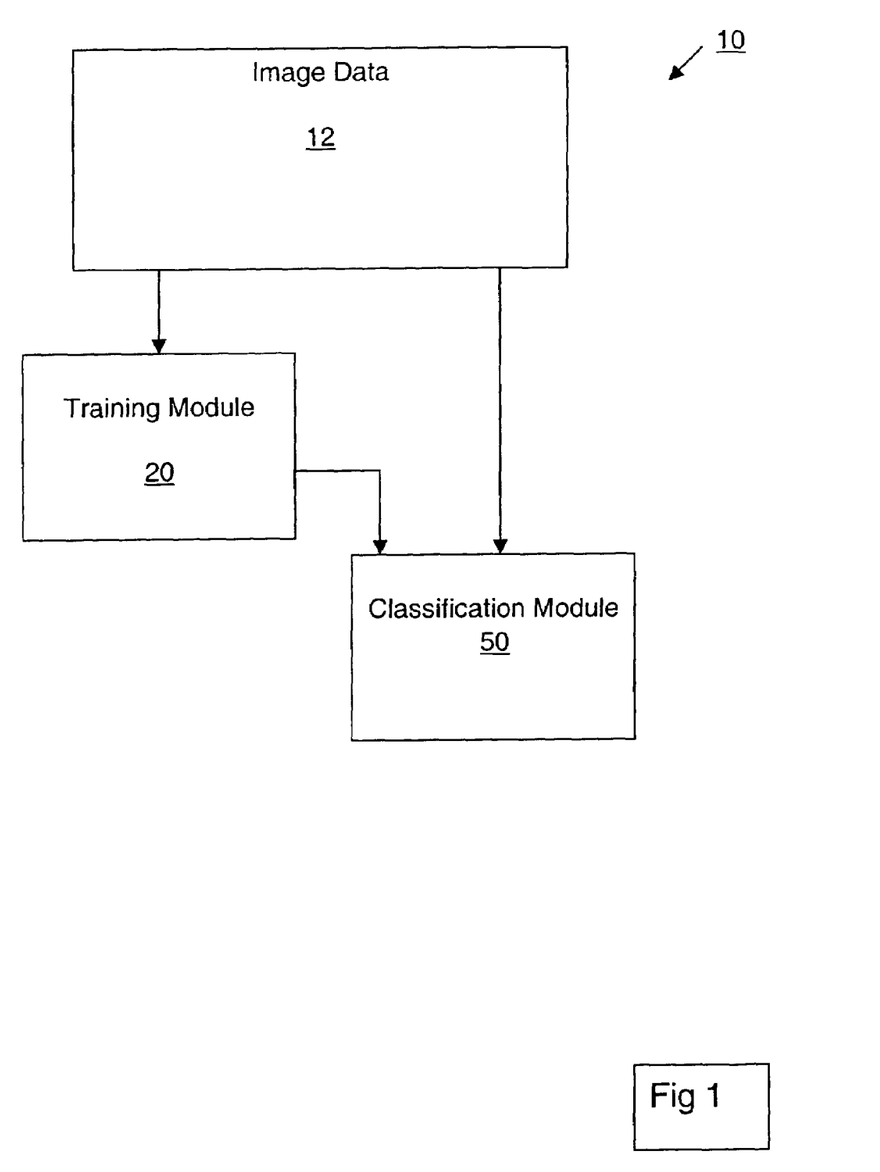
FIG. 1 schematically illustrates software module logic flow for an implementation of a fast support vector machine.

FIG. 1 illustrates an object classification system 10 for high speed data analysis of large data sets using a support vector machine. Such data sets 12 can include static or video imagery containing objects to be identified or classified. The processing procedure for system 10 may be performed by a properly programmed general-purpose computer alone or in connection with a special purpose computer. Such processing may be performed by a single platform or by a distributed processing platform. In addition, such processing and functionality can be implemented in the form of special purpose hardware, custom application specific integrated circuits (ASICs), configurable FPGA circuits, or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

A support vector machine is used because it has good generalization performance even for high dimensional input data and small training sets. This makes them a method of choice for many binary classification tasks. A support vector machine solves the following quadratic program:

$$\max_{\alpha_i} \sum_{i=1}^{n} \alpha_i - \frac{1}{2} \sum_{i=1}^{n} \sum_{j=1}^{n} y_i y_j \alpha_i \alpha_j K(x_i, x_j)$$

$$\text{subject to } \sum_{i=1}^{n} y_i \alpha_i = 0, \ 0 \le \alpha_i \forall i$$

where n is the number of training examples, $x_i \in R^k$ is the training example i and $y_i \in \{-1, +1\}$ is the class of $x_i$.

Other support vector machine formulations, e.g. with an $L_1$-norm error penalty C, are transparent to this method. Common kernel functions $K(x_i, x_j)$ are the linear kernel $K(x_i, x_j) = x_i^T x_j$, polynomial kernels $K(x_i, x_j) = (x_i^T x_j + c)^d$ of degree d, sigmoid kernels $K(x_i, x_j) = \tan h(x_i^T x_j + c)$ and radial basis function (RBF) kernels $K(x_i, x_j) = \exp(-\|x_i - x_j\|^2 / c)$ with $c \in R$.

Computation speed during the support vector machine training procedure is improved by a one time pre-computation step. For example, if $A \in R^{m \times k}$ is the matrix that represents the linear transformation applied to the raw input data set to derive linear features, with vector size of the raw input data being k, with vector size of the linear features being m, and wherein $B := A^T A$, an upper triangular matrix $U \in R^{k \times k}$ such that $B = U^T U$ is determinable, and $x_i'' = U x_i$ for all $x_i$ of the training set is numerically calculated at improved speeds for $k < m$.

Figure 2:
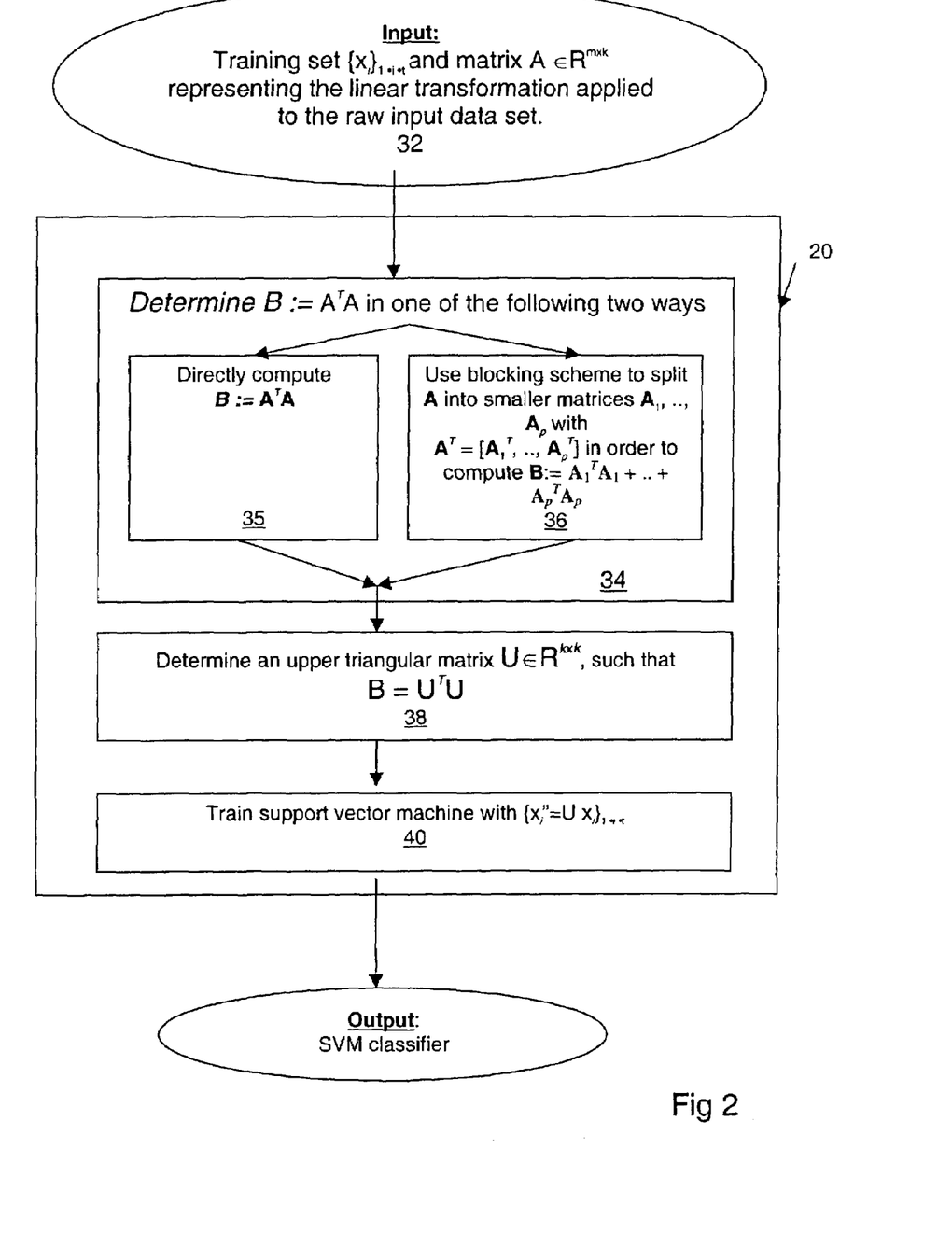
FIG. 2 more specifically illustrates a training procedure for a support vector machine with linear input features.

This can be seen with respect to FIG. 2, where a training software module and procedure 20 requires the linear transformation applied to the raw input data set to derive linear features as well as the raw training data as input (32), determines $B := A^T A$ (module 34), optionally optimized for available memory (module 36). Factorization of B results in upper triangular matrix $U \in R^{k \times k}$ (module 38) suitable for training such that $B = U^T U$.

More specifically, a linear kernel evaluation is determined as $$K(z_i, z_j) = z_i^T z_j = x_i^T A^T A x_j = x_i^T B x_j$$

where $B = A^T A$ is symmetric and $B \in R^{k \times k}$.

A Cholesky factorization of B results in $U^T U = B$ where $U \in R^{k \times k}$ is an upper triangular matrix. If a SVM is trained on $x_i'' = U x_i$ instead of $z_i = A x_i$ the results of all kernel evaluations remain unchanged and the solution $\alpha_i$ is identical. However, there are several benefits of using $x_i'' \in R^k$ instead of $z_i \in R^m$:

1) evaluating a feature vector $z_i = Ax$ is not necessary.
2) $x_i''$ can usually be stored in memory as it is just as large as the original training data $x_i$.
3) For over-complete feature sets, i.e. $m > k$, the dot product $x_i''^T x_j''$ is of lesser complexity than $z_i^T z_j$.

Polynomial kernels $[(K(x_i, x_j) = (x_i^T x_j + c)^d$ of degree d] and sigmoid kernels $[K(x_i, x_j) = \tan h(x_i^T x_j + c)]$ also use the dot product $z_i^T z_j$ internally, allowing substitution of $K(z_i, z_j)$ with $K(x_i'', x_j'')$.

The same is true for RBF kernels $[K(x_i, x_j) = \exp(-\|x_i - x_j\|^2 / c)]$, as can be seen after a few reformulations. A simple reformulation of $\|z_i - z_j\|^2$ helps:

$$\|z_i - z_j\|^2 = \|A(x_i - x_j)\|^2$$
$$= (x_i - x_j)^T A^T A (x_i - x_j)$$
$$= (x_i - x_j)^T U^T U (x_i - x_j)$$
$$= \|U(x_i - x_j)\|^2$$
$$= \|U x_i - U x_j\|^2$$

and substituting $K(z_i, z_j)$ with $K(x_i'', x_j'')$ also can be used.

Since the optimal solution is still the same, the support vector machine can be trained alternatively with $x_i''$ instead of with $z_i = A x_i$.

In certain situations, straightforward implementation of this procedure is not possible because of hardware limitations. For example, A might be too large to fit into available computer memory (e.g., in our application A is typically larger than 100,000×1000, while B is only 500×500). However, a blocking scheme can be used to split A into smaller matrices $$A_1, \ldots, A_p \text{ with } A^T = [A_1^T, \ldots, A_p^T]$$

It follows that:

$$A^T A = [A_1^T, \ldots, A_p^T] [A_1, \ldots, A_p]^T = A_1^T A_1 + \ldots + A_p^T A_p$$

Accordingly, B can be computed incrementally and only have to fit B and one of the smaller matrices into memory for each step.

To maintain numerical stability, double or greater precision calculations are generally required. Relative errors of 30% and more for the values of $K(x_i'', x_j'')$ can be encounter if single precision float values are used for A and B. Double precision floats usually provides enough significant digits and is more accurate than using $K(z_i, z_j)$ with single precision.

The Cholesky factorization $U^T U = B$ also introduces some numerical inaccuracy. It is possible to avoid it completely with a low additional memory overhead. If $x_i' = B x_i$, $x_i' \in R^k$ is computed (and keeping $x_i$ in memory as well) every kernel function can be expressed without referring to U. More exactly $K(z_i, z_j) = x_i^T x_j'$ for linear kernels and a similar result follows for polynomial and sigmoid kernels. For RBF kernels $s_i = x_i^T B x_i$ is storable and kernel evaluation is expressed as $$K(z_i, z_j) = K(x_i'' - x_j'')$$
$$= \exp(-(x_i U^T U x_i - 2 x_i U^T U x_j + x_j U^T U x_j)/c)$$
$$= \exp(-(s_i - 2 x_i^T x_j' + s_j)/c).$$

Figure 3:
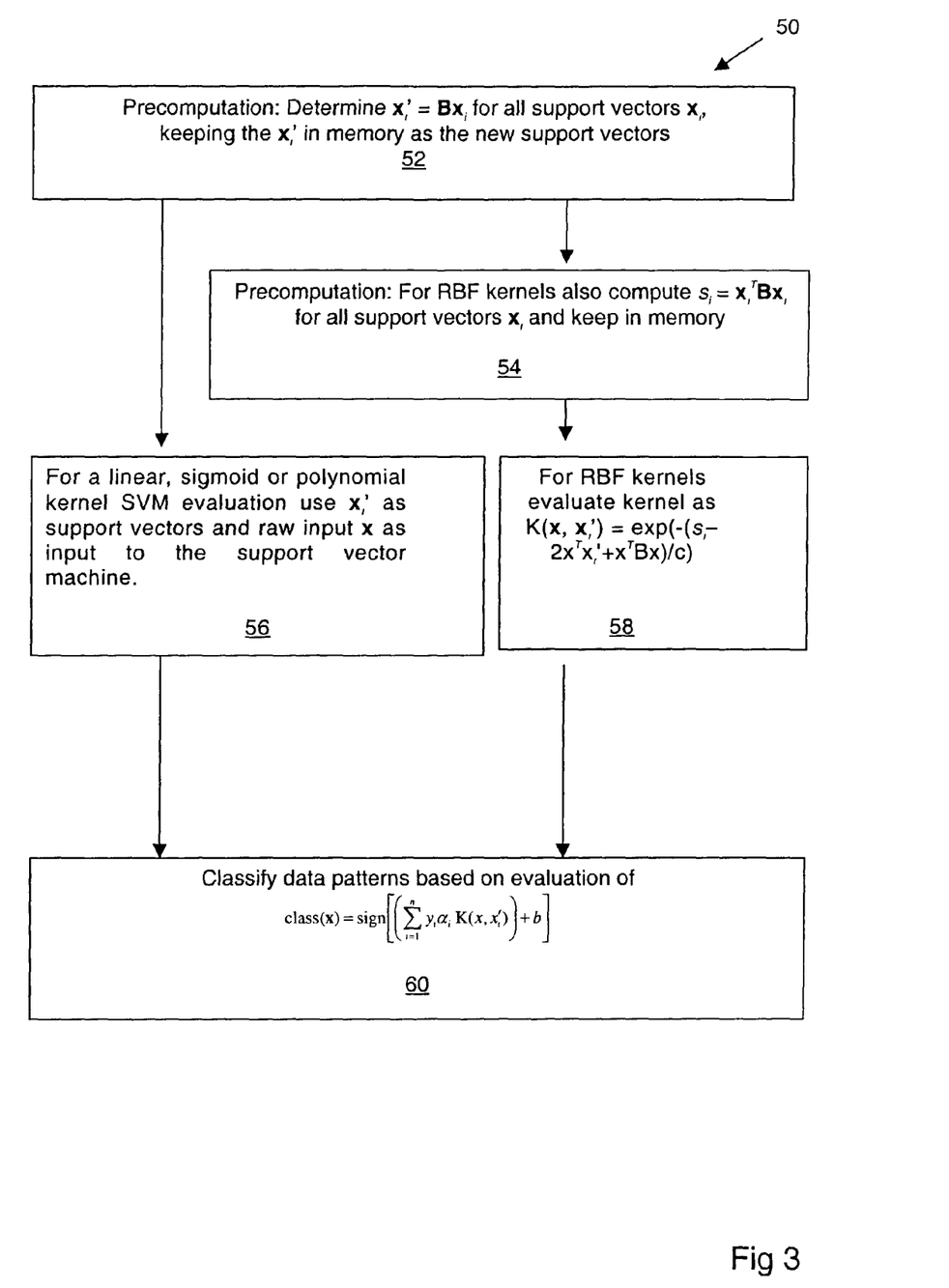
FIG. 3 more specifically illustrates an evaluation procedure of a trained support vector machine with linear input features.

Computation speed during evaluation of a trained support vector machine is also improved by a one-time pre-computation step for evaluation/classification of data sets. As seen in FIG. 3, an evaluation software module and procedure 50 requires determination (module 52) of $x_i'$ for all support vectors $x_i$, keeping the $x_i'$ in memory as the new support vectors. For linear kernels, $K(x, x_i') = x^T x_i'$ is determined (module 56), for polynomial kernels, $K(x, x_i') = (x^T x_i' + c)^d$ is determined, for sigmoid kernels, and $K(x, x_i') = \tan h(x^T x_i' + c)$ is determined (Note $K(z, z_j) = K(x, x_i')$.) The result is classified (module 60) For RBF kernels this procedure must be slightly modified as seen with respect modules 54 and 58 [$K(x, x_i') = \exp(-(s_i - 2 x^T x_i' + x^T B x)/c)$].

More specifically, the pre-computations requires determination of $x_i' = B x_i$ for all support vectors $x_i$, keeping the $x_i'$ in memory as the new support vectors. For linear, polynomial and sigmoid kernels:

$$K(z, z_j) = K(x, x_i')$$

where $z = A x$ and, thus, no linear features have to be evaluated.

For RBF kernels $$s_i = x_i^T B x_i$$

is also pre-computed for all support vectors $x_i$ and kept in memory. More specifically, RBF kernels are evaluated as:

$$K(x, x_i') = \exp(-(s_i - 2 x^T x_i' + x^T B x)/c)$$

requiring linear feature evaluation of $x^T B x$.

Computational complexity of classification mainly depends on three factors: feature evaluation, the dot product inside the kernel function and the number of support vectors. The evaluation scheme does not affect the number of support vectors. For m>>k classification is significantly faster, because dot product and feature evaluation are of lower complexity. For m≈k only feature evaluation is faster. This effect is almost negligible for high support vector counts.

Figure 4:
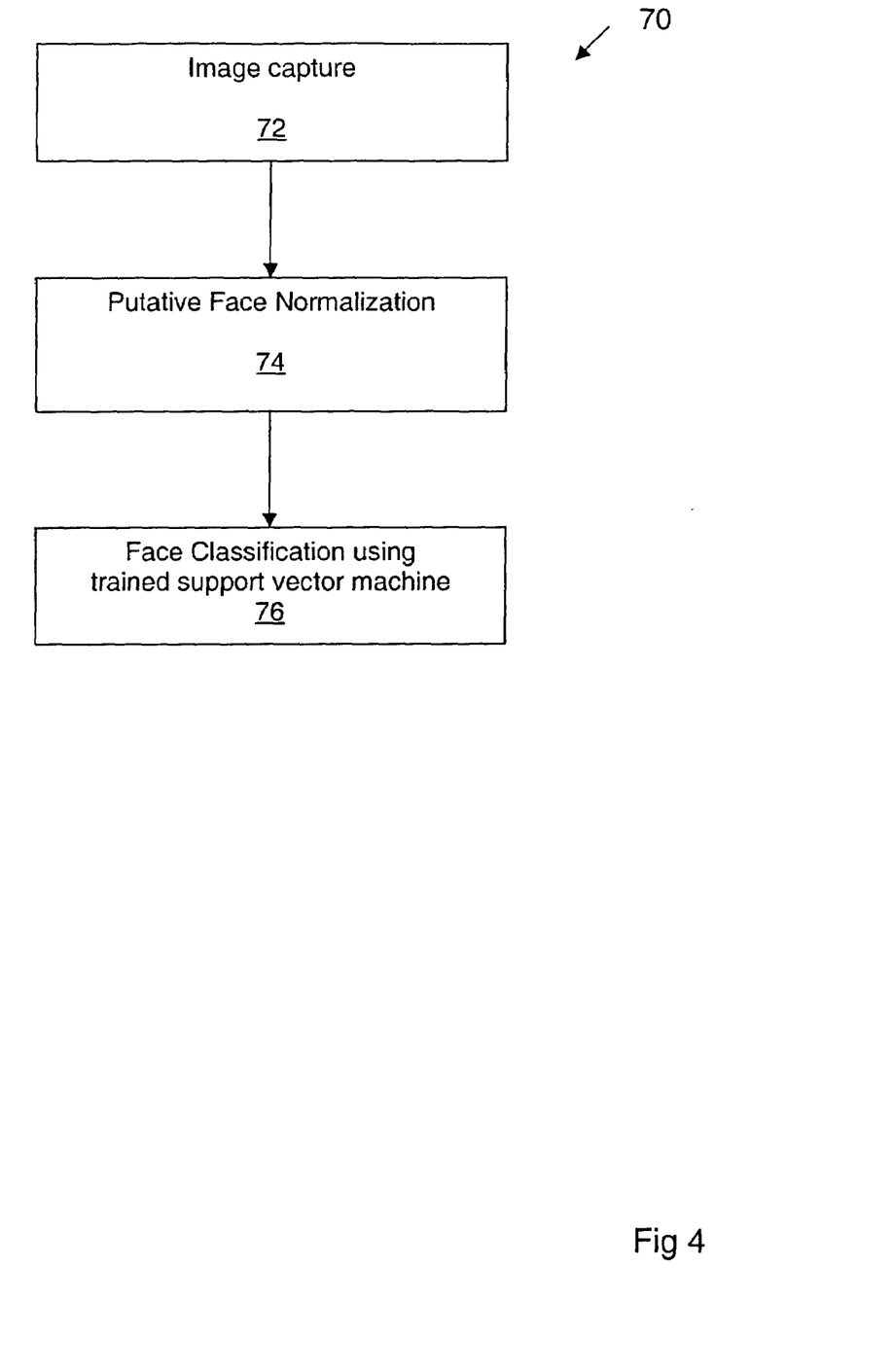
FIG. 4 illustrates process flow for face detection/recognition using a support vector machine.

Image recognition, classification, or analysis is a particularly useful application for support vector machines of the present invention. For example, high accuracy face detection system 70 can be implemented as indicated in FIG. 4 and the following:

Image capture 72 can be through conventional film cameras, digital cameras, video cameras, or digital video cameras. Image information can be recorded and stored in an analog format, or preferentially, can be converted to a suitable digital form, including but not limited to MPEG-2, MPEG-4, JPEG, Motion JPEG, or other sequentially presentable transform coded images commonly used for digital image storage. Low cost, low resolution CCD or CMOS based video camera systems can be used, although still or video cameras supporting higher frame rates and resolution may be useful for certain applications.

After image capture and storage, normalization 74 of static 2-dimensional imagery is required. In one example, a training set of 2,162 faces is gathered and normalized so that eyes and mouth were roughly at the same position for all faces. This set was then randomly split into 1,652 faces for training and 510 faces for validation. Each face pattern was used to generate several training examples of size 24×24 by randomly mirroring, rotating between ±10°, scaling by a factor between 0.9 and 1.1, and translating up to half a pixel. This resulted in a training set of 16,520 and a validation set of 10,200 faces. A contrast stretching operation was then used to saturate roughly 5% of the pixels and to achieve some basic lighting correction.

Negative training examples were generated from a set of 9,805 images that did not contain faces and then were processed by the same lighting correction method as the positive class. 5,000 negative examples were used for training and a different set of 2*10^6 negative examples for validation. It is important to realize that lighting correction is a non-linear operation, but feature evaluation occurs after this step and is still linear.

Conventional Haar-like feature prototypes are scaled independently in x and y direction by integer factors up to a maximum extend of 24×24. Each resulting feature is then translated to every possible position in a 24×24 window. Typically, a complete feature set contains over 200,000 features. Support vector machine feature evaluation 76 is straightforward. Let $S_w$ be the sum of pixels corresponding to the white area and $A_w$ be the number of these pixels. Similarly define $S_b$ and $A_b$ for the black area and set $S_o = S_w + S_b$ and $A_o = A_w + A_b$. A feature's value is then $f = w_0 s_0 - w_b s_b$ with $$w_0 = 0.5 \sqrt{\frac{A_b}{A_w A_0}} \text{ and } w_b = 0.5 \sqrt{\frac{A_0}{A_w A_b}}.$$

Note that pixels corresponding to the black area are effectively weighted by $(w_0 - w_b)$ as $A_0$ covers them, too. The weights $w_0$ and $w_b$ ensure that a constant is added to every pixel does not change f and that roughly 95% of feature values satisfy $-1<f<+1$ for images containing random Gaussian noise.

These weights were also chosen because support vector machines require all input features to lie roughly in the same range, e.g. [−1, +1], so that convergence of the quadratic programming optimization is assured. These weights also lead to a good classification performance and speed.

However, other choices that maintain the same ratio $w_0/w_b$, but scale feature values differently are also possible. For example:

$$f' = \sqrt{\frac{A_0}{A_w A_b}} f, f'' = \sqrt{\frac{A_w A_b}{A_0}} f$$

Remember that $A_w \sim A_0$ and $A_b \sim A_0$, hence f' uses less weight for features with a larger support $A_0$ than f. f" on the other hand weights larger features even stronger. In effect it compares pixel sums as $f''=0.5*S_0 A_b/A_0 - 0.5*S_b$.

To speed up feature evaluation for comparison with our method a table-driven procedure can be implemented. A feature evaluation then only needs 6 to 9 table lookups and does not depend on the spatial extent of a feature.

The improvements possible with use of this procedure are apparent from consideration of the following table, with the final row labelled "precomputation" providing results from use of the improved procedure:

|  | Training | | | | Classification | |
|---|---|---|---|---|---|---|
|  |  | Pre- |  |  |  |  |
|  | Memory complexity | computation Step | Kernel evaluation | Training time | Memory complexity | Classifier evaluation |
| No Caching | 2m + nk 45 MB | — | $2c_f + c_K(m)$ 101,540 µs | 1,850 min | $kN_s + 2m$ 7.6 MB | $c_f + N_s(c_f + c_K(m))$ 51.6 s |
| Caching | nm 16,052 MB | $nc_f$ 500 s | $c_K(m)$ 1,540 µs | 34 min | $m(N_s + 1)$ 1,607 MB | $c_f + N_s c_K(m)$ 1.54 s |
| Precomputation | $nk + k^2$ 46 MB | $(m + n/2)k^2$ 50 s | $c_K(k)$ 5 µs | 0.883 min | $kN_s$ 4.4 MB | $N_s c_K(k)$ 0.005 s |

Timing results are derived from comparison of memory and computational complexity for n=10,000 training examples, with k=576 input pixels, m=210,400 linear features and a resulting classifier with $N_s$=1,000 support vectors. $c_f$ is the running time for one feature evaluation, and $c_K(x)$ for a dot product of dimension x. An Intel Pentium® 4 operated at 2 GHz measured $c_f \approx 24$ µs with the optimized evaluation scheme and $c_K(k) \approx 5$ µs, $c_K(m) \approx 1540$ µs using the platform-optimized math-kernel library from Intel.

Figure 5:
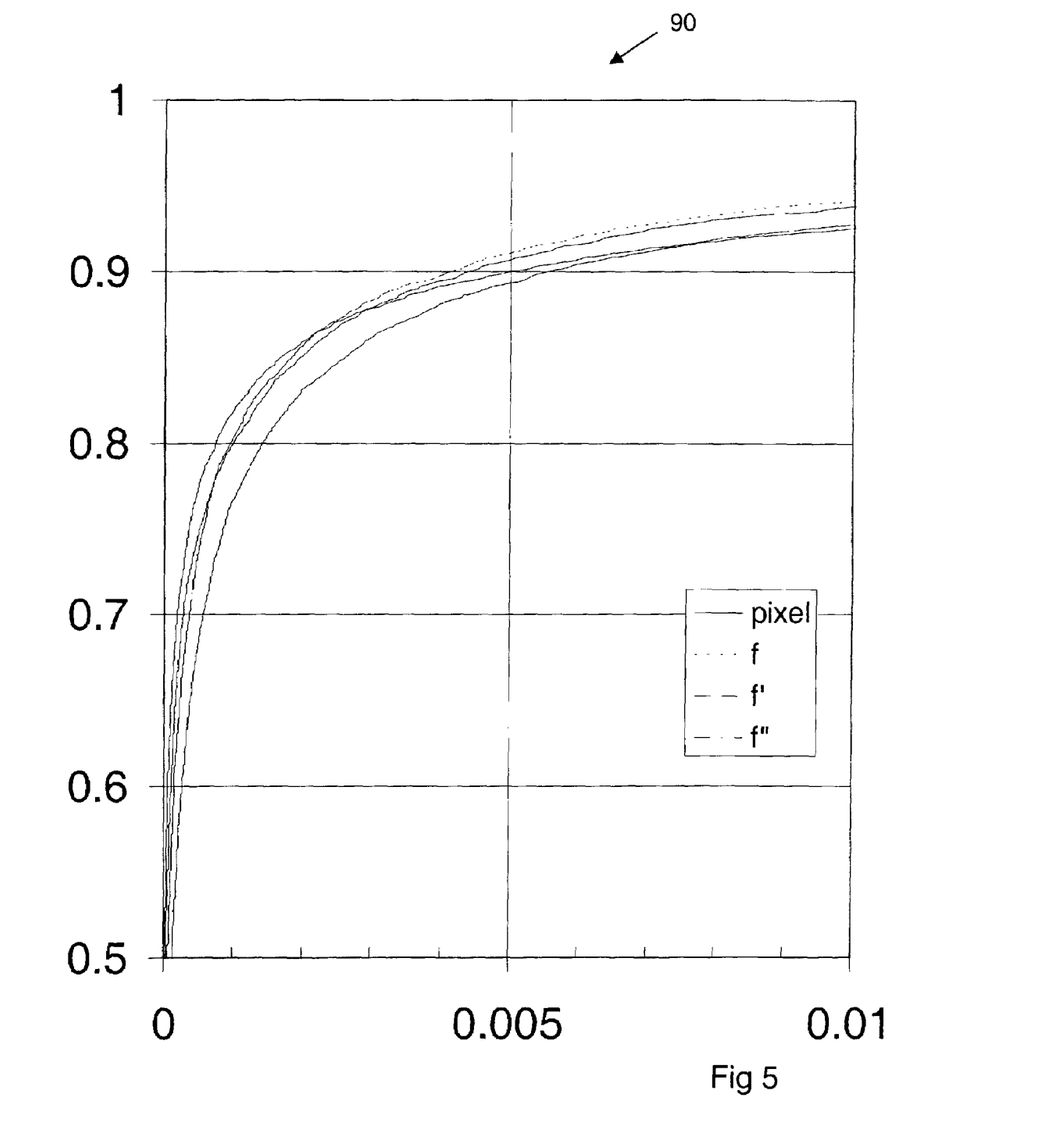
FIG. 5 compares the receiver operating characteristic curves (ROC curves) for support vector machines using pixel features and the three different types of linear features f, f', and f''.

Overall, training of a polynomial classifier of degree 2 for pixel features and for a linear feature set with different feature weights achieves comparable classification performance as conventional pixel feature classification, particularly for detection rates between 80% and 95%. This is best seen with respect to FIG. 5, where graph 90 is a comparison of receiver operating characteristic curves (ROC curves) for support vector machines using pixel features and the three different types of linear features f, f', and f". Pixel features resulted in a classifier with 2,270 support vectors, while linear features of type f resulted in a classifier with 1,005, f' with 1,267 and f" with 1,011 support vectors. Since the classification for a polynomial kernel with linear features has the same complexity as for pixel features, classifiers using linear features are roughly 50% faster due to a lower support vector count.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

The claimed invention is:

1. An image recognition method comprising
   normalizing static image data; and
   classifying the normalized static image data using a support vector machine with a defined kernel that implicitly evaluates a linear kernel on input data after a one-time precomputation of an image training data set,
     wherein for some positive integers k, and m, the vector size of the normalized input data is k, the vector size of the linear features of the input data is m, with m being greater than k, and
     wherein the precomputation comprises a transformation in $R^{k \times k}$; and
   performing an image recognition based at least in part on the classifying.

2. The method of claim 1, wherein the classified static image data is a face.

3. The method of claim 1, wherein $A \in R^{m \times k}$ is the matrix representing the linear transformation applied to the normalized static input image data, and wherein $B \in R^{k \times k}$ is determined by computing $B := A^T A$.

4. The method of claim 1, wherein $A \in R^{m \times k}$ is the matrix representing the linear transformation applied to the normalized static input image data, and wherein $B \in R^{k \times k}$ is determined by computing $B:=A^T A$ using a blocking scheme to split A into a set of smaller matrices $A_1, \ldots, A_p$ with $A^T=[A_1^T, \ldots, A_p^T]$, for incremental computation of $B \in R^{k \times k}$.

5. The method of claim 1, further comprising a pre-computation determination of $x_i'=Bx_i$ for all support vectors $x_i$ prior to classification, keeping the $x_i'$ in memory as new support vectors.

6. The method of claim 1, wherein the defined kernel is a linear kernel.

7. The method of claim 1, wherein the defined kernel is a sigmoid kernel.

8. The method of claim 1, wherein the defined kernel is a polynomial kernel.

9. The method of claim 1, wherein the defined kernel is a RBF kernel.

10. The method of claim 1, wherein the defined kernel is a RBF kernel evaluated as $K(x_i, x_i')=\exp(-(s_i-2x^T x_i'+x^T Bx)/c$, further comprising a pre-computation determination of $x_i'=Bx_i$ for all support vectors $x_i$ and a pre-computation determination of $s_i=x_i^T Bx_i$ for all pairs of support vectors $x_i$ and $x_j$ prior to classification, keeping the $x_i'$ as new support vectors and $s_i$ in memory.

11. An article comprising a storage medium having stored thereon instructions that when executed by a machine result in:
    normalizing static image data; and
    classifying the normalized static image data using a support vector machine with a defined kernel that implicitly evaluates a linear kernel on input data after a one-time precomputation of an image training data set,
        wherein for some positive integers k, and m, the vector size of the normalized input data is k, the vector size of the linear features of the input data is m, within being greater than k, and
        wherein the precomputation comprises a transformation in $R^{k \times k}$ and
    performing an image recognition based at least in part on the classifying.

12. The article comprising a storage medium having stored thereon instructions according to claim 11, wherein the classified static image data is a face.

13. The article comprising a storage medium having stored thereon instructions according to claim 11, wherein $A \in R^{m \times k}$ is the matrix representing the linear transformation applied to the normalized static input image data, and wherein $B \in R^{k \times k}$ is determined by computing $B:=A^T A$.

14. The article comprising a storage medium having stored thereon instructions according to claim 11, wherein $A \in R^{m \times k}$ is the matrix representing the linear transformation applied to the normalized input static image data set, , and wherein $B \in R^{k \times k}$ is determined by computing $B:=A^T A$ using a blocking scheme to split A into a set of smaller matrices $A_1, \ldots, A_p$ with $A^T=[A_1^T, \ldots, A_p^T]$, for incremental computation of $B \in R^{k \times k}$.

15. The article comprising a storage medium having stored thereon instructions according to claim 11, wherein the defined kernel is a linear kernel.

16. The article comprising a storage medium having stored thereon instructions according to claim 11, wherein the defined kernel is a sigmoid kernel.

17. The article comprising a storage medium having stored thereon instructions according to claim 11, wherein the defined kernel is a polynomial kernel.

18. The article comprising a storage medium having stored thereon instructions according to claim 11, wherein the defined kernel is a RBF kernel.

19. The article comprising a storage medium having stored thereon instructions according to claim 11, wherein a pre-computation determination of $x_i'=Bx_i$ for all support vectors $x_i$ is made prior to classification, keeping the $x_i'$ in memory as new support vectors.

20. The article comprising a storage medium having stored thereon instructions according to claim 11, wherein the defined kernel is a RBF kernel evaluated as
    $K(x, x_i')=\exp(-(s_i-2x^T x_i'+x^T Bx)/c$, further comprising a pre-computation determination of $x_i'=Bx_i$ for all support vectors $x_i$ and a pre-computation determination of $s_i=x_i^T Bx_i$ for all pairs of support vectors $x_i$ and $x_j$ prior to classification, keeping the $x_i'$ as new support vectors and $s_i$ in memory.

21. A system for improving speed of support vector machines comprising:
    a software module to normalize static image data; and
    a classification module to evaluate the normalized static image data using a support vector machine with a defined kernel that implicitly evaluates a linear kernel on input data after a one-time precomputation of an image training data set
        wherein for some positive integers k, and in, the vector size of the normalized input data is k, the vector size of the linear features of the input data is m, with m being greater than k, and
        wherein the precomputation comprises a transformation in $R^{k \times k}$; and
    performing an image recognition based at least in part on the classifying.

22. The system of claim 21, wherein the static image data is a face.

23. The system of claim 21, wherein $A \in R^{m \times k}$ is the matrix representing the linear transformation applied to the normalized static input image data, and wherein $B \in R^{k \times k}$ is determined by computing $B:=A^T A$.

24. The system of claim 21, wherein $A \in R^{m \times k}$ is the matrix representing the linear transformation applied to the input static image data set, with vector size of the input static image data being k, and wherein $B \in R^{k \times k}$ is determined by computing $B:=A^T A$ using a blocking scheme to split A into a set of smaller matrices $A_1, \ldots, A_p$ with $A^T=[A_1^T, \ldots, A_p^T]$, for incremental computation of $B \in R^{k \times k}$.

25. The system of claim 21, wherein the defined kernel is a linear kernel.

26. The system of claim 21, wherein the defined kernel is a sigmoid kernel.

27. The system of claim 21, wherein the defined kernel is a polynomial kernel.

28. The system of claim 21, wherein the defined kernel is a RBF kernel.

29. The system of claim 21, wherein a pre-computation determination of $x_i'=Bx_i$ for all support vectors $x_i$ is made prior to classification, keeping the $x_i'$ in memory as new support vectors.

30. The system of claim 21, wherein the defined kernel is a RBF kernel evaluated as
    $K(x, x_i')=\exp(-(s_i-2x^T x_i'+x^T Bx)/c$, further comprising a pre-computation determination of $x_i'=Bx_i$ for all support vectors $x_i$ and a pre-computation determination of $s_i=x_i^T Bx_i$ for all pairs of support vectors $x_i$ and $x_j$ prior to classification, keeping the $x_i'$ as new support vectors and $s_i$ in memory.

31. An image recognition training and classification method comprising;
   training a support vector machine using a one-time precomputation of a large feature data set to implicitly evaluate a linear kernel; and
   classifying normalized static image data using a support vector machine with a defined kernel that implicitly evaluates a linear kernel on input data after a one-time precomputation of an image training data set
      wherein for some positive integers k, and m, the vector size of the normalized input data is k, the vector size of the linear features of the input data is m, with m being greater than k, and
      wherein the precomputation comprises a transformation in $R^{k \times k}$ and performing an image recognition based at least in part on the classifying.

32. The method of claim 31, wherein the classified static image data is a face.

33. The method of claim 31, wherein one-time precomputation sets $A \in R^{m \times k}$ as a matrix representing the linear transformation applied to the static input image data set, and wherein $B \in R^{k \times k}$ is determined by computing $B := A^T A$ using a blocking scheme to split A into a set of smaller matrices $A_1, \ldots, A_p$ with $A^T = [A_1^T, \ldots, A_p^T]$, for incremental computation of $B \in R^{k \times k}$.

34. An article comprising a storage medium having stored thereon instructions that when executed by a machine result in:
   training a support vector machine using a one-time precomputation of a large feature data set to implicitly evaluate a linear kernel; and
   classification of normalized static image data using a support vector machine with a defined kernel that implicitly evaluates a linear kernel on input data after a one-time precomputation of an image training data set
      wherein for some positive integers k, and m, the vector size of the normalized input data is k, the vector size of the linear features of the input data is m, with m being greater than k, and
      wherein the precomputation comprises a transformation in $R^{k \times k}$; and
   performing an image recognition based at least in part on the classifying.

35. The article comprising a storage medium having stored thereon instructions according to claim 34, wherein the classified static image data is a face.

36. The article comprising a storage medium having stored thereon instructions according to claim 34, wherein one-time precomputation sets $A \in R^{m \times k}$ as a matrix representing the linear transformation applied to the input static image data set, and wherein $B \in R^{k \times k}$ is determined by computing $B := A^T A$ using a blocking scheme to split A into a set of smaller matrices $A_1, \ldots, A_p$ with $A^T = [A_1^T, \ldots, A_p^T]$, for incremental computation of $B \in R^{k \times k}$.

37. An image recognition training and classification system comprising:
   a training module for a support vector machine providing a one-time precomputation of a large feature data set to implicitly evaluate a linear kernel; and
   a classification module for normalized static image data using a support vector machine with a defined kernel that implicitly evaluates a linear kernel on input data after a one-time precomputation of an image training data set
      wherein for some positive integers k, and m, the vector size of the normalized input data is k, the vector size of the linear features of the input data is m, with m being greater than k, and
      wherein the precomputation comprises a transformation in $R^{k \times k}$; and
   performing an image recognition based at least in part on the classifying.

38. The system of claim 37, wherein the classified static image data is a face.

39. The system of claim 37, wherein one-time precomputation sets $A \in R^{m \times k}$ as a matrix representing the linear transformation applied to the input static image data set, and wherein $B \in R^{k \times k}$ is determined by computing $B := A^T A$ using a blocking scheme to split A into a set of smaller matrices $A_1, \ldots, A_p$ with $A^T = [A_1^T, \ldots, A_p^T]$, for incremental computation of $B \in R^{k \times k}$.

* * * * *